Patented Jan. 15, 1946

2,392,837

UNITED STATES PATENT OFFICE 2,392,837

REACTION PRODUCTS OF ALDEHYDES AND DIAZINE DERIVATIVES

Gaetano F. D'Alelio and James W. Underwood, Pittsfield, Mass., assignors to General Electric Company, a corporation of New York No Drawing. Application August 26, 1942, Serial No. 456,260

22 Claims. (Cl. 260—42)

This invention relates to the production of new synthetic materials and especially to new reaction products of particular utility in the plastics and coating arts. Specifically the invention is concerned with compositions of matter comprising a condensation product of ingredients comprising an aldehyde, including polymeric aldehydes, hydroxyaldehydes and aldehyde-addition products, e. g., formaldehyde, paraformaldehyde, aldol, glucose, dimethylol urea, trimethylol melamine, etc., and a diazine derivative corresponding to the following general formula:

I 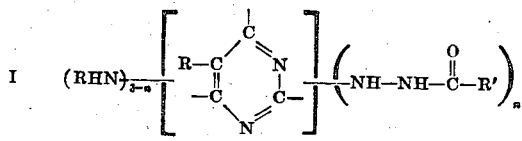

In the above formula $n$ represents an integer and is at least 1 and not more than 3, R represents a member of the class consisting of hydrogen and monovalent hydrocarbon and substituted hydrocarbon radicals, more particularly halohydrocarbon radicals, and R' represents a member of the class consisting of monovalent aliphatic hydrocarbon radicals and monovalent aromatic and nuclearly substituted, specifically nuclearly halogenated, aromatic hydrocarbon radicals. From the above formula it will be noted that when $n$ is 3 there will be no —NHR groups attached to the diazine nucleus.

Illustrative examples of radicals that R in the above formula may represent are: aliphatic (e. g., methyl, ethyl, propyl, isopropyl, butyl, secondary butyl, isobutyl, butenyl, amyl, isoamyl, hexyl, octyl, allyl, methallyl, crotyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, anthracyl, etc.); aliphatic-substituted aryl (e. g., tolyl, xylyl, ethylphenyl, propylphenyl, isopropylphenyl, allylphenyl, 2-butenylphenyl, propenylphenyl, tertiary-butylphenyl, methylnaphthyl, etc.); aryl-substituted aliphatic (e. g., benzyl, cinnamyl, phenylethyl, phenylpropyl, etc.); and their homologues, as well as those groups with one or more of their hydrogen atoms substituted by, for example, a halogen, more particularly chlorine, bromine, fluorine or iodine. Specific examples of halogeno-substituted hydrocarbon radicals that R in the above formula may represent are: chloromethyl, chloroethyl, chlorophenyl, dichlorophenyl, ethyl chlorophenyl, chlorocyclohexyl, phenyl chloroethyl, bromoethyl, bromopropyl, fluorophenyl, iodophenyl, bromotolyl, etc. Preferably R is hydrogen.

Illustrative examples of monovalent aliphatic and aromatic hydrocarbon radicals that R' in the above formula may represent are radicals such as above mentioned with reference to R. Illustrative examples of monovalent, nuclearly substituted, specifically nuclearly halogenated, aromatic hydrocarbon radicals that R' also may represent are: chlorophenyl, dichlorophenyl, bromophenyl, dibromophenyl, iodophenyl, fluorophenyl, chlorotolyl, bromotolyl, chloroxylyl, chloronaphthyl, dichloronaphthyl, chloroxenyl, dichloroxenyl, bromoxenyl and the like. Preferably R' represents a lower alkyl radical or a phenyl radical.

Instead of the acylhydrazino pyrimidines (1,3- or metadiazines) represented by Formula I, corresponding derivatives of the 1,2- or ortho-diazines (pyridazines) or of the 1,4- or para-diazines (pyrazines) may be used.

The diazine derivatives that are used in carrying the present invention into effect are more fully described and are specifically claimed in our copending application Serial No. 456,262, filed concurrently herewith and assigned to the same assignee as the present invention. More specific examples of diazine derivatives that may be employed in producing our new condensation products are the tri-(carboacylhydrazino) pyrimidines, the di - (carboacylhydrazino) amino (—NHR) pyrimidines and the carboacylhydrazino diamino [(—NHR)$_2$] pyrimidines. As pointed out in copending application Serial No. 456,262, a method of preparing the diazine derivatives used in carrying the present invention into effect comprises effecting reaction in the presence of a hydrohalide acceptor, e. g., a tertiary base such as a trialkyl or a triaryl amine, between (1) a hydrazino diazine corresponding to the general formula

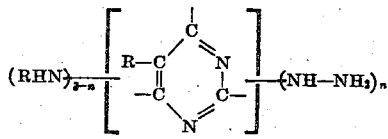

where $n$ and R have the same meanings as given above with reference to Formula I, and (2) a compound corresponding to the general formula

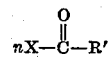

where X represents a halogen atom, and $n$ and R' have the same meanings as given above with reference to Formula I.

Other examples of diazine derivatives embraced by Formula I that may be employed in practicing our invention are listed below:

4-acetylhydrazino 2,6-diamino pyrimidine (6-acetylhydrazino 2,4-diamino pyrimidine)
2-acetylhydrazino 4,6-diamino pyrimidine
4-acetylhydrazino 2,6-di-(methylamino) pyrimidine 2-acetylhydrazino 4,6-di-(methylamino) pyrimidine
2,4-di-(acetylhydrazino) 6-amino pyrimidine
4,6-di-(acetylhydrazino) 2-amino pyrimidine
2-diethylbenzoylhydrazino 4,6-dianilino pyrimidine
2-acetylhydrazino 4,6-di-(ethylamino) pyrimidine
4-acetylhydrazino 2,6-dianilino pyrimidine
4-acetylhydrazino 2,6-ditoluido pyrimidine
2-acetylhydrazino 4,6-di-(cyclopentylamino) pyrimidine
2-acetylhydrazino 4-methylamino 6-amino pyrimidine
2-acetylhydrazino 4-anilino 6-amino pyrimidine
2-acetylhydrazino 4-methylamino 6-anilino pyrimidine
4-acetylhydrazino 2,6-diamino 5-methyl pyrimidine
4-acetylhydrazino 2,6-di-(methylamino) 5-methyl pyrimidine
2-acetylhydrazino 4,6-diamino 5-phenyl pyrimidine
2-acetylhydrazino 4,6-dianilino 5-fluorophenyl pyrimidine
2-propionylhydrazino 4-methylamino 6-bromoanilino pyrimidine
2-propionylhydrazino 4-iodoanilino 5-phenyl 6-amino pyrimidine
2-propionylhydrazino 4,6-diamino 5-chlorobutyl pyrimidine
2-benzoylhydrazino 4-chloropropylamino 5-xylyl 6-anilino pyrimidine
2,4-di-(propionylhydrazino) 6-amino pyrimidine
2,4-di-(acetylhydrazino) 6-anilino pyrimidine
2,4-di-(acetylhydrazino) 5-methyl 6-methylamino pyrimidine
2,4,6-tri-(acetylhydrazino) 5-methyl pyrimidine
2,4,6-tri-(acetylhydrazino) 5-phenyl pyrimidine
2,4,6-tri-(propionylhydrazino) 5-ethyl pyrimidine
2,4,6-tri-(propionylhydrazino) 5-xenyl pyrimidine
2-acetylhydrazino 4-benzoylhydrazino 6-amino pyrimidine
2,4,6-tri-(benzoylhydrazino) pyrimidine
2,4-di-(chlorobenzoylhydrazino) 6-amino pyrimidine
2,4-di-(propionylhydrazino) 6-methallylamino pyrimidine
2-acetylhydrazino 4-propionylhydrazino 6-benzoylhydrazino pyrimidine
2,4-di-(acetylhydrazino) 6-propionylhydrazino pyrimidine
4-acetylhydrazino 2,6-di-(iodoanilino) pyrimidine
2-propionylhydrazino 4,6-di-(bromotoluido) pyrimidine
4-(bromobenzoylhydrazino) 2,6-di-chloroanilino) 5-naphthyl pyrimidine
2-acetylhydrazino 4,6-di-(allylamino) pyrimidine
4-propionylhydrazino 2,6-di-(cyclohexenylamino) pyrimidine
4-acetylhydrazino 2,6-di-(octylamino) 5-pentyl pyrimidine
2,4-di-(butyrylhydrazino) 6-amino pyrimidine
4,6-di-(acetylhydrazino) 2-methylamino pyrimidine
2,4,6-tri-(acetylhydrazino) pyrimidine
4-propionylhydrazino 2,6-di-(methylamino) pyrimidine
2-propionylhydrazino 4,6-diamino pyrimidine
2-isobutanoylhydrazino 4,6-diamino pyrimidine
2-propenoylhydrazino 4,6-diamino pyrimidine
2-hexahydrobenzoylhydrazino 4,6-diamino pyrimidine
2-benzoylhydrazino 4,6-di-(methylamino) pyrimidine
2-toluylhydrazino 4,6-di-(ethylamino) pyrimidine
2-benzoylhydrazino 4,6-diamino pyrimidine
2-toluylhydrazino 4,6-diamino pyrimidine
4-ethylbenzoylhydrazino 2,6-di-(propenylamino) pyrimidine
4-dimethylbenzoylhydrazino 2,6-di-(cyclopentylamino) pyrimidine From the foregoing description it will be seen that the acylhydrazino-substituted diazines used in carrying the present invention into effect include compounds corresponding to the general formula II 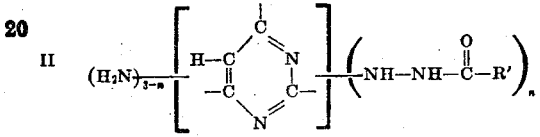

where 'R' represents a member of the class consisting of monovalent aliphatic hydrocarbon radicals and monovalent aromatic and nuclearly halogenated aromatic hydrocarbon radicals.

The present invention is based on our discovery that new and valuable materials of particular utility in the plastics and coating arts can be produced by effecting reaction between ingredients comprising essentially an aldehyde, including polymeric aldehydes, hydroxyaldehydes and aldehyde-addition products, and a diazine derivative of the kind embraced by Formula I, numerous examples of which have been given above and in our copending application Serial No. 456,262.

In the production of molded articles from molding compositions comprising a filled or unfilled thermosetting resin, it is highly desirable that the molding compound have a high plastic flow during molding combined with a rapid cure to an insoluble, infusible state. Surprisingly it was found that the heat-curable resinous condensation products of this invention and molding compositions made therefrom show excellent flow characteristics during a short curing cycle. The molded articles have a high dielectric strength and very good resistance to arcing. They have a good surface finish and excellent resistance to water, being better, in general, than the ordinary urea-formaldehyde resins in this respect. The cured resins of the present invention also have a high resistance to heat and abrasion and, therefore, are especially suitable for use where optimum heat- and abrasion-resistance are properties of primary importance.

It has been suggested heretofore that resinous condensation products be made by condensing an aliphatic aldehyde containing not more than four carbon atoms with a compound corresponding to the general formula III 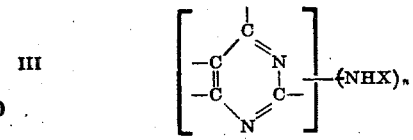

wherein $n$ is at least 2, X stands for a member of the group consisting of H and $-NH_2$ and wherein, to the carbon atoms, are attached members of the class consisting of the aforesaid —NHX groups, hydrogen, alkyl, phenyl, phenylene, hydroxy, alkoxy, mercapto, thioether and substituted amino groups. Although such resins have valuable properties and are suitable for many applications, their water resistance and degree of cure are often inadequate for many electrically insulating uses and other applications of the cured resin or of molded articles made from molding compositions containing the thermosetting resin. Furthermore, the plasticity of the heat-curable resin and of molding compounds prepared therefrom often is unsatisfactory for molding many articles, particularly articles of intricate design the successful molding of which requires high placticity of the molding compound during molding in order that the compound will flow rapidly and uniformly to all parts of the mold. These and other disadvantages in the materials of the above-mentioned class are avoided by using as a starting reactant a diazine derivative of the kind embraced by Formula I.

In carrying our invention into effect the initial condensation reaction may be effected at normal or at elevated temperatures, at atmospheric, subatmospheric or super-atmospheric pressures, and under neutral, alkaline or acid conditions. Preferably the reaction between the components is initiated under alkaline conditions.

Any substance yielding an alkaline or an acid aqueous solution may be used in obtaining alkaline or acid conditions for the initial condensation reaction. For example, we may use an alkaline substance such as sodium, potassium or calcium hydroxides, sodium or potassium carbonates, mono-, di- or tri-amines, etc. In some cases it is desirable to cause the initial condensation reaction between the components to take place in the presence of a primary condensation catalyst and a secondary condensation catalyst. The primary catalyst advantageously is either an aldehyde-non-reactable nitrogen-containing basic tertiary compound, e. g., tertiary amines such as trialkyl (e. g., trimethyl, triethyl, etc.) amines, triaryl (e. g., triphenyl, tritolyl, etc.) amines, etc., or an aldehyde-reactable nitrogen-containing basic compound, for instance ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of the primary catalyst, advantageously is a fixed alkali, for instance a carbonate, cyanide or hydroxide of an alkali metal (e. g., sodium, potassium, lithium, etc.).

Illustrative examples of acid condensation catalysts that may be employed are inorganic or organic acids such as hydrochloric, sulfuric, phosphoric, acetic, lactic, acrylic, malonic, etc., or acid salts such as sodium acid sulfate, monosodium phosphate, monosodium phthalate, etc. Mixtures of acids, of acid salts or of acids and of acid salts may be employed if desired.

The reaction between the aldehyde, e. g., formaldehyde, and the diazine derivative may be carried out in the presence or absence of solvents or diluents, fillers, other natural or synthetic resinous bodies, or while admixed with other materials that also can react with the aldehydic reactant or with the diazine derivative, e. g., urea

(NH₂CONH₂)

thiourea, selenourea and iminourea (guanidine), substituted ureas, thioureas, selenoureas and iminoureas, more particularly urea derivatives such as mentioned, for example, in D'Alelio Patent No. 2,285,418, page 1, column 1, lines 41-49; monoamides of monocarboxylic and polycarboxylic acids and polyamides of polycarboxylic acids, e. g., acetamide, halogenated acetamides (e. g., a chlorinated acetamide), maleic monoamide, malonic monoamide, phthalic monoamide, maleic diamide, fumaric diamide, malonic diamide, itaconic diamide, succinic diamide, phthalic diamide, the monoamide, diamide and triamide of tricarballylic acid, etc.; aldehyde-reactable diazines other than the diazine derivatives constituting the primary components of the resins of the present invention; aminotriazines, e. g., melamine, ammeline, ammelide, melem, melam, melon, numerous other examples being given in the various copending applications of one or both of us, for instance in D'Alelio copending application Serial No. 377,524, filed February 5, 1941, and in applications referred to in said copending application; phenol and substituted phenols, e. g., the cresols, the xylenols, the tertiary alkyl phenols and other phenols such as mentioned, for example, in D'Alelio Patent No. 2,239,441; monohydric and polyhydric alcohols, e. g., butyl alcohol, amyl alcohol, heptyl alcohol, octyl alcohol, 2-ethylbutyl alcohol, ethylene glycol, propylene glycol, glycerine, polyvinyl alcohol, etc.; amines, including aromatic amines, e. g., aniline, etc.; and the like. The modifying reactants may be incorporated with the diazine derivative to form an intercondensation product by mixing all the reactants and effecting condensation therebetween or by various permutations of reactants as described, for example, in D'Alelio Patent No. 2,285,418 with particular reference to reactions involving a urea, an aliphatic aldehyde and a chlorinated acetamide. For example, we may form a partial condensation product of ingredients comprising (1) urea or melamine or urea and melamine, (2) a diazine derivative of the kind embraced by Formula I, for instance 4-acetylhydrazino 2,6-diamino pyrimidine, 2-acetylhydrazino 4,6-diamino pyrimidine, 2,4-di-(acetylhydrazino) 6-amino pyrimidine, 4,6-di-(acetylhydrazino) 2-amino pyrimidine, 2,4,6-tri-(acetylhydrazino) pyrimidine, 4-propionylhydrazino 2,6-diamino pyrimidine, 4-acetylhydrazino 2,6-di-(methylamino) pyrimidine, etc., and (3) an aldehyde, including polymeric aldehydes, hydroxyaldehydes and aldehyde-addition products, e. g., formaldehyde, paraformaldehyde, aldol, dimethylol urea, etc. Thereafter, we may effect reaction between this partial condensation product and, for example, a curing reactant, specifically a chlorinated acetamide, to obtain a heat-curable composition.

Some of the condensation products of this invention are thermoplastic materials even at an advanced stage of condensation, while others are thermosetting or potentially thermosetting bodies that convert under heat or under heat and pressure to an insoluble, infusible state. The thermoplastic condensation products are of particular value as plasticizers for other synthetic resins. The thermosetting or potentially thermosetting resinous condensation products, alone or mixed with fillers, pigments, dyes, lubricants, plasticizers curing agents, etc., may be used, for example, in the production of molding compositions.

The liquid intermediate condensation products of the invention may be concentrated or diluted further by the removal or addition of volatile solvents to form liquid coating compositions of adjusted viscosity and concentration. The heat-convertible or potentially heat-convertible resinous condensation products may be used in liquid state, for instance as surface-coating materials, in the production of paints, varnishes, lacquers, enamels, etc., for general adhesive applications, in producing laminated articles and for numerous other purposes. The liquid heat-hardenable or potentially heat-hardenable condensation products also may be used directly as casting resins, while those which are of a gel-like nature in partially condensed state may be dried and granulated to form clear, unfilled heat-convertible resins.

In order that those skilled in the art better may understand how the present invention may be carried into effect, the following examples are given by way of illustration and not by way of limitation. All parts are by weight.

*Example 1*

| | Parts |
|---|---|
| 4-acetylhydrazino 2,6-di-(methylamino) pyrimidine | 31.5 |
| Aqueous formaldehyde (approx. 37.1% HCHO) | 48.6 |
| Sodium hydroxide in 2 parts water | 0.04 |
| Chloroacetamide (monochloroacetamide) | 0.4 |

All of the above ingredients with the exception of the chloroacetamide were heated together under reflux at the boiling temperature of the mass for 14 minutes. The chloroacetamide was now added and heating under reflux was continued for an additional 5 minutes. The resulting resinous syrup had a pH of 8.75. A molding (moldable) composition was made from this syrup by mixing therewith 27.8 parts alpha cellulose in flock form and 0.2 part of a mold lubricant, specifically zinc stearate. The wet molding compound was dried at 60° C. for 30 minutes. A well-cured molded piece having a well-knit and homogeneous structure was obtained by molding a sample of the dried and ground molding compound for 3 minutes at 135° C. under a pressure of 2,000 pounds per square inch. The molded piece had excellent resistance to water as shown by the fact that it absorbed only 0.37% by weight of water when immersed in boiling water for 15 minutes, followed by immersion in cold water for 5 minutes. The molding compound showed good plastic flow during molding.

Instead of using chloroacetamide in accelerating the curing of the potentially reactive resinous material, heat-convertible compositions may be produced by adding to the partial condensation product (in syrupy or other form) direct or active curing catalysts (e. g., citric acid, phthalic anhydride, malonic acid, oxalic acid, etc.), or latent curing catalysts (e. g., sodium chloroacetate, N-diethyl chloroacetamide, glycine ethyl ester hydrochloride, etc.), or by intercondensation with curing reactants other than monochloroacetamide (e. g., di- and tri-chloroacetamides, chloroacetonitriles, alpha, beta-dibromopropionitrile, ethylene diamine hydrochloride, aminoacetamide hydrochloride, the ethanolamine hydrochlorides, nitrourea, chloroacetyl urea, chloroacetone, glycine, sulfamic acid, citric diamide, phenacyl chloride, etc.). Other examples of curing reactants that may be employed to accelerate or to effect the curing of the thermosetting or potentially thermosetting resins of this and other examples are given in various copending applications of one or both of use, for instance in D'Alelio copending applications Serial No. 346,962, filed July 23, 1940, now Patent No. 2,325,375, and Serial No. 354,395, filed August 27, 1940, now Patent No. 2,325,376, both of which applications issued on July 27, 1943, and are assigned to the same assignee as the present invention.

*Example 2*

| | Parts |
|---|---|
| 4-acetylhydrazino 2,6-di-(methylamino) pyrimidine | 6.3 |
| Urea | 14.4 |
| Aqueous formaldehyde (approx. 37.1% HCHO) | 48.6 |
| Sodium hydroxide in 1.5 parts water | 0.03 |
| Aqueous ammonia (approx. 28% NH₃) | 2.0 |
| Chloroacetamide | 0.3 |

All of the above ingredients with the exception of the chloroacetamide were heated together under reflux at boiling temperature for 15 minutes. Thereafter the chloroacetamide was added and heating under reflux was continued for an additional 5 minutes. The syrup produced in this manner had a pH of 7.41. A molding compound was prepared by mixing this syrup with 23.8 parts alpha cellulose and 0.2 part zinc stearate. The wet molding composition was dried at 60° C. for one hour. A well-cured molded piece having good cohesive characteristics was obtained by molding a sample of the dried and ground molding compound for 3 minutes at 135° C. under a pressure of 2,000 pounds per square inch. The plasticity of the molding compound during molding was entirely satisfactory.

*Example 3*

| | Parts |
|---|---|
| 4-acetylhydrazino 2,6-di-(methylamino) pyrimidine | 10.8 |
| Aqueous formaldehyde (approx. 37.1% HCHO) | 48.6 |
| Para-amino benzene sulfonamide | 12.9 |
| Sodium hydroxide in 1.7 parts water | 0.035 |
| Chloroacetamide | 0.35 |

All of the above ingredients with the exception of the chloroacetamide were heated together under reflux at boiling temperature for 6 minutes. At the end of this period of time the chloroacetamide was added and heating under reflux was continued for an additional one minute. The resulting viscous, resinous syrup, which had a pH of 9.87, was mixed with 24.1 parts alpha cellulose and 0.2 part zinc stearate to form a molding compound. The wet molding composition was dried at 60° C. for 30 minutes. A sample of the dried and ground molding compound was molded as described under Example 2. The molded piece was well cured throughout, had excellent cohesive characteristics and good water resistance. The molding composition showed good plastic flow during molding.

*Example 4*

| | Parts |
|---|---|
| 4-acetylhydrazino 2,6-di-(methylamino) pyrimidine | 10.8 |
| Dimethylol urea (commercial grade containing approx. 11% by weight of water) | 40.4 |
| Sodium hydroxide in 2.5 parts water | 0.05 |
| Chloroacetamide | 0.5 |
| Water | 80.0 |

All of the above ingredients with the exception of the chloroacetamide were heated together under reflux at the boiling temperature of the mass for 15 minutes. The chloroacetamide was now added and heating under reflux was continued for an additional 5 minutes. The resulting resinous syrup, which had a pH of 8.71, was mixed with 13.8 parts alpha cellulose and 0.2 part zinc stearate to form a molding compound. The wet molding composition was dried for 6 hours at 60° C. A well-cured molded piece having good water resistance, a high degree of resiliency and excellent cohesive characteristics was obtained by molding a sample of the dried and ground molding compound for 3 minutes at 135° C. under a pressure of 2,000 pounds per square inch. The molding compound showed excellent plastic flow during molding.

*Example 5*

| | Parts |
|---|---|
| 4-acetylhydrazino 2,6-di-(methylamino) pyrimidine | 31.5 |
| Acrolein | 25.2 |
| Sodium hydroxide in 1.5 parts water | 0.03 |
| Water | 20.0 | were mixed together, the acrolein being added last. An immediate exothermic reaction took place and a resinous mass precipitated from the solution without the application of additional heat. When a sample of the resin was heated on a 140° C. hot plate, it cured rapidly to an infusible mass. The resinous material of this example is suitable for use in the production of molding compositions.

*Example 6*

| | Parts |
|---|---|
| 4-acetylhydrazino 2,6-di-(methylamino) pyrimidine | 31.5 |
| Butyl alcohol | 55.5 |
| Aqueous formaldehyde (approx. 37.1% HCHO) | 48.6 |
| Sodium hydroxide in 3.5 parts water | 0.07 | were heated together under reflux at the boiling temperature of the mass for 15 minutes. When a sample of the resulting resinous syrup was heated on a 140° C. hot plate, it bodied to a thermoplastic resin. The syrupy condensation product was potentially heat-curable as evidenced by the fact that when chloroacetamide, citric acid, nitrourea, glycine or other curing agent such as mentioned under Example 1 was incorporated either into the syrup or into the dehydrated resin, followed by heating on a 140° C. hot plate, an insoluble and infusible resin was obtained. A portion of the syrup as originally produced was dehydrated by heating it on a steam plate. The dehydrated resin was soluble in water, ethyl alcohol and ethylene glycol but was insoluble in benzene and Solvatone. The solubility and film-forming characteristics of the resinous material of this example make it particularly suitable for use in the preparation of liquid coating compositions.

*Example 7*

| | Parts |
|---|---|
| 4-acetylhydrazino 2,6-di-(methlylamino) pyrimidine | 31.5 |
| Acetamide | 8.8 |
| Aqueous formaldehyde (approx. 37.1% HCHO) | 48.6 |
| Sodium hydroxide in 2 parts water | 0.04 | were heated together under reflux at boiling temperature for 15 minutes. The resulting syrupy condensation product was potentially heat-curable as shown by the fact that when chloroacetamide, sulfamic acid, glycine or other curing agent such as mentioned under Example 1 was added to the syrup, followed by heating at 140° C., the resinous material was converted to a cured or insoluble and infusible state. The plasticity of the thermosetting resin during curing indicated that the product of this example would be suitable for use as a modifier of aminoplasts and other synthetic resins of unsatisfactory flow characteristics to improve the plasticity thereof.

*Example 8*

| | Parts |
|---|---|
| 4-acetylhydrazino 2,6-di-(methylamino) pyrimidine | 23.6 |
| Diethyl malonate | 6.0 |
| Aqueous formaldehyde (approx. 37.1% HCHO) | 48.6 |
| Sodium hydroxide in 2 parts water | 0.04 | were heated together under reflux at boiling temperature for 9 minutes. A resin precipitated from the solution upon cooling to room temperature. This resin cured slowly to an infusible mass in the absence of a curing agent when a sample of it was heated on a 140° C. hot plate. The addition of chloroacetamide, sulfamic acid or other curing agent such as mentioned under Example 1 accelerated the conversion of the resin to an insoluble and infusible state.

*Example 9*

| | Parts |
|---|---|
| 4-acetylhydrazino 2,6-di-(methylamino) pyrimidine | 31.5 |
| Glycerine | 13.8 |
| Aqueous formaldehyde (approx. 37.1% HCHO) | 48.6 |
| Sodium hydroxide in 2.5 parts water | 0.05 | were heated together under reflux at the boiling temperature of the mass for 15 minutes. The resulting syrup was dehydrated by heating it on a steam plate. The dehydrated resin was soluble in water and ethylene glycol but was substantially insoluble in ethyl alcohol, Solvatone and benzene. A sample of the dehydrated syrup was treated with a small amount of chloroacetamide and the resulting material then was heated on a 140° C. hot plate. The chloroacetamide-containing composition cured rapidly to an insoluble and infusible state. Instead of chloroacetamide, other curing agents such as mentioned under Example 1 may be incorporated into the initial condensation product to accelerate its conversion under heat to an insoluble and infusible state.

Two portions of the dehydrated syrup, to one of which had been added a small amount of hydrochloric acid, were applied to glass plates. The coated plates then were heated at an elevated temperature for several hours. In both cases the baked films were hard, transparent and water-resistant. The film yielded by the composition containing the hydrochloric acid was flexible, curling, smooth and very glossy. The other film, that is, the one produced by the composition to which no hydrochloric acid had been added, was wrinkled and adhered tightly to the glass surface. The resinous material of this example may be used in the preparation of liquid coating compositions or as a modifier of other synthetic resins having unsatisfactory flow characteristics to improve their plasticity.

*Example 10*

| | Parts |
|---|---|
| 4-acetylhydrazino 2,6-di-(methylamino) pyrimidine | 31.5 |
| Polyvinyl alcohol | 6.7 |
| Aqueous formaldehyde (approx. 37.1% HCHO) | 48.6 |
| Sodium hydroxide in 2 parts water | 0.04 |
| Water | 20.0 | were heated together under reflux at the boiling temperature of the mass for 15 minutes, yielding a very viscous solution. Samples of the resulting resinous syrup, both with and without hydrochloric acid as a curing agent, were applied to glass plates and the coated plates baked for several hours at 60° C. The hydrochloric acid-treated material yielded a baked film that was transparent, water-resistant, curling, smooth, glossy and flexible. The unmodified syrup yielded a baked film that was very transparent, water-resistant, smooth, glossy and with marked adhesive characteristics.

It will be understood, of course, by those skilled in the art that the reaction between the aldehyde and the diazine derivative may be effected at temperatures ranging, for examples, from room temperature to the fusion or boiling temperature of the mixed reactants or of solutions of the mixed reactants, the reaction proceeding more slowly at normal temperatures than at elevated temperatures in accordance with the general law of chemical reactions. Thus, instead of effecting reaction between the ingredients of Examples 1 to 10, inclusive, at boiling temperature under reflux, the reaction between the components may be carried out at lower temperatures, for example at temperatures ranging from room temperature to a temperature near the boiling temperature, using longer reaction periods and, in some cases, stronger catalysts and higher catalyst concentrations.

It also will be understood by those skilled in the art that our invention is not limited to condensation products obtained by reaction of ingredients comprising an aldehyde and the specific acylhydrazino diazine named in the above illustrative examples. Thus, instead of 4-acetyl-hydrazino 2,6-di-(methylamino) pyrimidine we may use, for example, 2-acetylhydrazino 4,6-di-(methylamino) pyrimidine, 4-acetylhydrazino, 2,6-diamino pyrimidine, 2-acetylhydrazino 4,6-diamino pyrimidine, 2,4-di-(acetylhydrazino) 6-amino pyrimidine, 4,6-di-(acetylhydrazino) 2-amino pyrimidine, 2,4,6-tri-(acetylhydrazino) pyrimidine, 4-butyrylhydrazino 2,6-diamino pyrimidine, or any other compound of the kind embraced by Formula I, numerous examples of which have been given above and in our copending application Serial No. 456,262.

In producing these new condensation products the choice of the aldehyde is dependent largely upon economic considerations and upon the particular properties desired in the finished product. We prefer to use as the aldehydic reactant formaldehyde or compounds engendering formaldehyde, e. g., paraformaldehyde, hexamethylene tetramine, etc. Illustrative examples of other aldehydes that may be employed are acetaldehyde, propionaldehyde, butyraldehyde, heptaldehyde, octaldehyde, methacrolein, crotonaldehyde, benzaldehyde, furfural, hydroxyaldehydes (e. g., aldol, glucose, glycollic aldehyde, glyceraldehyde, etc.), mixtures thereof, or mixtures of formaldehyde (or compounds engendering formaldehyde) with such aldehydes. Illustrative examples of aldehyde-addition products that may be used instead of the aldehydes themselves are the mono- and poly-(N-carbinol) derivatives, more particularly the mono- and poly-methylol derivatives of urea, thiourea, selenourea and iminourea, and of substituted ureas, selenoureas, thioureas and iminoureas, mono- and poly- (N-carbinol) derivatives of amides of polycarboxylic acids, e.. g., maleic, itaconic, fumaric, adipic, malonic, succinic, citric, phthalic, etc., mono- and poly-(N-carbinol) derivatives of the aminotriazoles, of the aminotriazines, etc. Particularly good results are obtained with active methylene-containing bodies such as a methylol urea, more particularly mono- and di-methylol ureas, and a methylol melamine, e. g., monomethylol melamine and polymethylol melamines (di-, tri-, tetra-, penta- and hexa-methylol melamines). Mixtures of aldehydes and aldehyde-addition products may be employed, e. g., mixtures of formaldehyde and methylol compounds such, for instance, as dimethylol urea, trimethylol melamine, hexamethylol melamine, etc.

The ratio of the aldehydic reactant to the diazine derivative may be varied over a wide range depending upon the particular properties desired in the finished product. Ordinarily these reactants are employed in an amount corresponding to at least one mol of the aldehyde, specifically formaldehyde, for each mol of the diazine derivative. Thus, we may use, for example, from 1 to 8 or 9 or more mols of an aldehyde for each mol of the diazine derivative. When the aldehyde is available for reaction in the form of an alkylol derivative, more particularly a methylol derivative such, for instance, as dimethylol urea, trimethylol melamine, etc., then higher amounts of such aldehyde-addition products are used, for instance from 2 or 3 up to 15 or 20 or more mols of such alkylol derivatives for each mol of the diazine derivative.

As indicated hereinbefore, and as further shown by a number of the examples, the properties of the fundamental resins of this invention may be varied widely by introducing other modifying bodies before, during, or after effecting condensation between the primary components. Thus, as modifying agents we may use, for example, methyl, ethyl, propyl, isopropyl, isobutyl, hexyl, etc., monohydric alcohols; polyhydric alcohols such, for example, as diethylene glycol, triethylene glycol, pentaerythritol, etc.; alcohol-ethers, e. g., ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, etc.; amides such as formamide, stearamide, acrylamide, benzene sulfonamides, toluene sulfonamides, adipic diamide, phthalamide, etc., amines, e. g., ethylene diamine, phenylene diamine, etc.; ketones, including halogenated ketones; nitriles, including halogenated nitriles, e. g., acrylonitrile, methacrylonitrile, succinonitrile, chloroacetonitriles, etc.; acylated ureas, more particularly halogenated acylated ureas of the kind described, for example, in D'Alelio Patent No. 2,281,559; and others.

The modifying bodies also may take the form of high molecular weight bodies with or without resinous characteristics, for example, hydrolyzed wood products, formalized cellulose derivatives, lignin, protein-aldehyde condensation products, aminotriazine-aldehyde condensation products, aminotriazole-aldehyde condensation products, triaminopyrimidine-aldeyde condensation products, etc. Other examples of modifying bodies are the urea-aldehyde condensation products, the aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl esters, e. g., polyvinyl acetate, polyvinyl butyrate, etc.; polyvinyl ethers, including polyvinyl acetals, specifically polyvinyl formal, etc.

Dyes, pigments, plasticizers, mold lubricants, opacifiers and various fillers (e. g., wood flour, glass fibers, asbestos, including defibrated asbestos, mineral wool, mica, cloth cuttings, etc.) may be compounded with the resin in accordance with conventional practice to provide various thermoplastic and thermosetting molding compositions.

The modified and unmodified resinous compositions of this invention have a wide variety of uses. For example, in addition to their use in the production of molding compositions, they may be used as modifiers of other natural and synthetic resins, as laminating varnishes in the production of laminated articles wherein sheet materials, e. g., paper, cloth, sheet asbestos, etc., are coated and impregnated with the resin, superimposed and thereafter united under heat and pressure. They may be used in the production of wire or baking enamels from which insulated wires and other coated products are made, for bonding together mica flakes in the production of resin-bonded abrasive articles such, for instance, as grindstones, sandpapers, etc., in the manufacture of electrical resistors, etc. They also may be employed for treating cotton, linen and other cellulosic materials in sheet or other form. They also may be used as impregnants for electrical coils and for other electrically insulating applications.

What we claim as new and desire to secure by Letters Patent of the United States is:

1. A composition of matter comprising the reaction product of ingredients comprising an aldehyde and a compound corresponding to the general formula

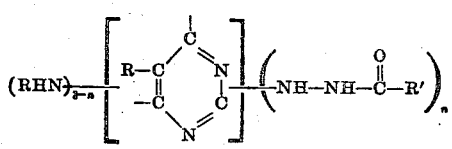

where $n$ represents an integer and is at least 1 and not more than 3, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrocarbon radicals.

2. A composition as in claim 1 wherein the aldehyde is formaldehyde.

3. A composition as in claim 2 wherein R represents hydrogen.

4. A composition as in claim 1 wherein R' represents an alkyl radical.

5. A composition as in claim 1 wherein R represents a hydrogen atom and R' represents an alkyl radical.

6. A composition as in claim 1 wherein the reaction product is an alkaline-catalyzed reaction product of the stated components.

7. A composition as in claim 1 wherein the reaction product is an alcohol-modified reaction product of the stated components.

8. A heat-curable resinous composition comprising a heat-convertible condensation product of ingredients comprising (1) formaldehyde and (2) a compound corresponding to the general formula

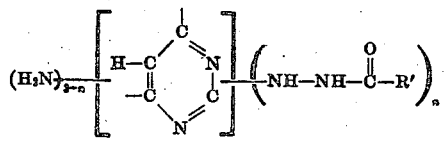

where R' represents a member of the class consisting of monovalent aliphatic hydrocarbon radicals and monovalent aromatic and nuclearly halogenated aromatic hydrocarbon radicals.

9. A product comprising the cured composition of claim 8.

10. A composition comprising the resinous product of reaction of ingredients including an aldehyde and a compound corresponding to the general formula

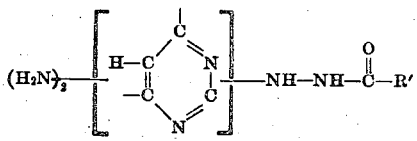

where R' represents a member of the class consisting of monovalent aliphatic hydrocarbon radicals and monovalent aromatic and nuclearly halogenated aromatic hydrocarbon radicals.

11. A resinous composition comprising the condensation product of ingredients comprising an acetylhydrazino diamino pyrimidine and formaldehyde.

12. A resinous composition comprising the product of reaction of ingredients comprising formaldehyde and 4-acetyl-hydrazino 2,6-di-(methylamino) pyrimidine.

13. A composition comprising the resinous product of reaction of ingredients including an aldehyde and a compound corresponding to the general formula

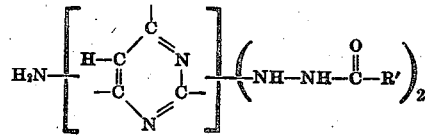

where R' represents a member of the class consisting of monovalent aliphatic hydrocarbon radicals and monovalent aromatic and nuclearly halogenated aromatic hydrocarbon radicals.

14. A composition comprising the product of reaction of ingredients comprising a urea, an aldehyde and a compound corresponding to the general formula

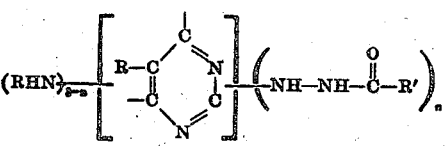

where $n$ represents an integer and is at least 1 and not more than 3, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrocarbon radicals.

15. A composition as in claim 14 wherein R represents hydrogen, the aldehyde is formaldehyde and the urea component is the compound corresponding to the formula $NH_2CONH_2$.

16. A resinous composition comprising the product of reaction of ingredients comprising urea, formaldehyde and an acetylhydrazino diamino pyrimidine.

17. A composition comprising the product of reaction of ingredients comprising an aminotriazine, an aldehyde and a compound corresponding to the general formula

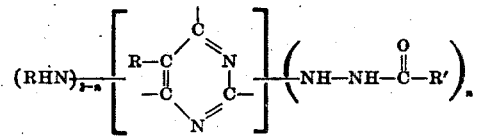

where $n$ represents an integer and is at least 1 and not more than 3, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrocarbon radicals.

18. A resinous composition comprising the product of reaction of ingredients comprising melamine, formaldehyde and an acetylhydrazino diamino pyrimidine.

19. A heat-curable composition comprising the heat-convertible resinous reaction product of (1) a product of partial reaction of ingredients including formaldehyde and a compound corresponding to the general formula

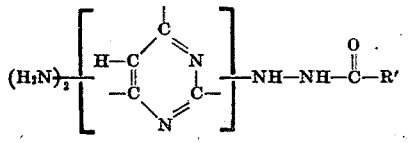

where R' represents a member of the class consisting of monovalent aliphatic hydrocarbon radicals and monovalent aromatic and nuclearly halogenated aromatic hydrocarbon radicals, and (2) a curing reactant.

20. The method of preparing new synthetic compositions which comprises effecting reaction between ingredients comprising an aldehyde and a compound corresponding to the general formula

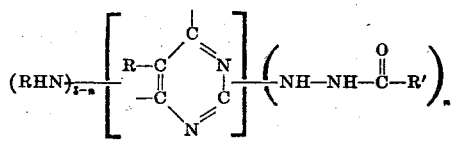

where $n$ represents an integer and is at least 1 and not more than 3, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrocarbon radicals.

21. A composition comprising the resinous reaction product of (1) a chlorinated acetamide and (2) a product of partial reaction of ingredients including formaldehyde and a compound corresponding to the general formula

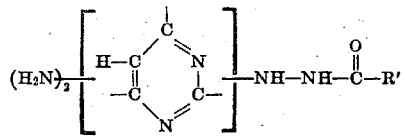

where R' represents a member of the class consisting of monovalent aliphatic hydrocarbon radicals and monovalent aromatic and nuclearly halogenated aromatic hydrocarbon radicals.

22. A composition comprising the resinous reaction product of (1) a chlorinated acetamide and (2) a product of partial reaction under alkaline conditions of ingredients including an acetylhydrazino diamino pyrimidine and formaldehyde.

GAETANO F. D'ALELIO.
JAMES W. UNDERWOOD.